Feb. 21, 1956 C. W. CHANLUND 2,735,153
MOLD
Filed Sept. 29, 1950 2 Sheets-Sheet 1

INVENTOR.
CARL W. CHANLUND
BY
Lyon & Lyon
ATTORNEYS

Feb. 21, 1956  C. W. CHANLUND  2,735,153
MOLD
Filed Sept. 29, 1950  2 Sheets-Sheet 2
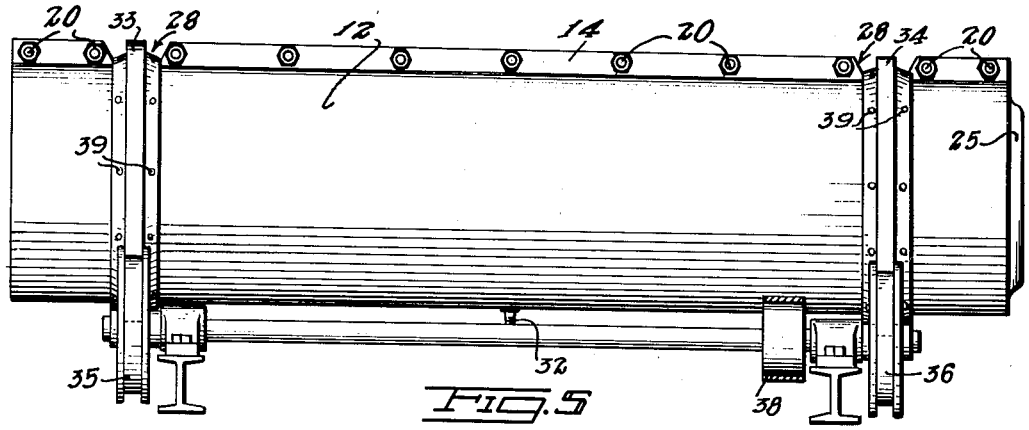
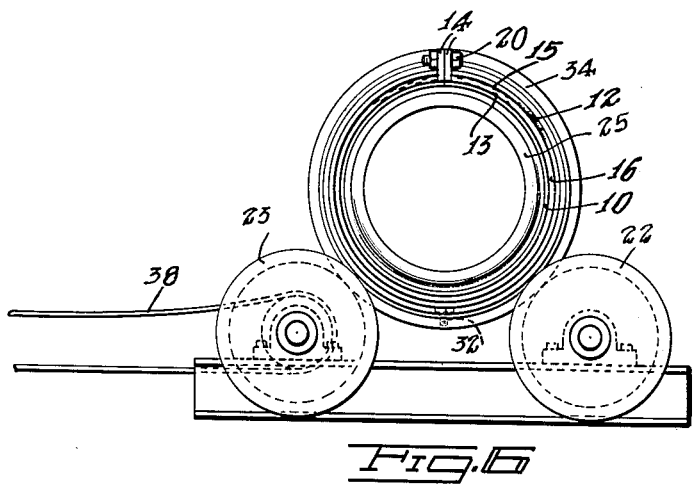
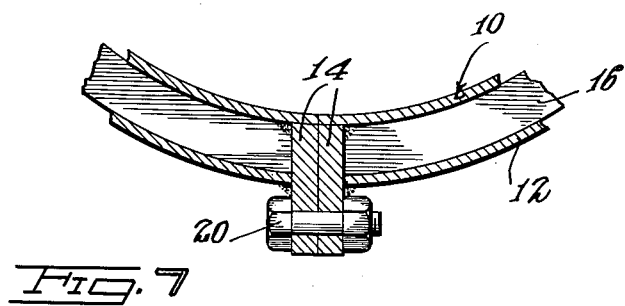
INVENTOR.
CARL W. CHANLUND
BY
*Lyon & Lyon*
ATTORNEYS United States Patent Office 2,735,153
Patented Feb. 21, 1956

2,735,153

MOLD

Carl W. Chanlund, Salt Lake City, Utah, assignor, by mesne assignments, to Cen-Vi-Ro Pipe Corporation, South Gate, Calif., a corporation of Delaware Application September 29, 1950, Serial No. 187,443

6 Claims. (Cl. 25—127)

This invention relates to improvements in molds for use in machines for molding concrete pipes, posts or the like, or for lining metal or other pipes with concrete or similar material.

A number of different types of machines are in use in the manufacture of beams, pipes, poles, and other hollow bodies from concrete and other substances by the centrifugal casting method. In such machines, a hollow tubular mold is employed which is rotated at a relatively high rate of speed by means of driven rollers or trunnions upon which the mold rests. Concrete, for example, is deposited into a spinning tubular mold and is distributed about the inner periphery of such mold as a result of centrifugal action. After the mold has been spun a sufficient period of time, the rotation of the mold is discontinued and the finished product is removed. In order to provide a mold from which can be removed the finished pipe or other product, it has in the past been customary to construct such molds of two semi-cylindrical sections. The two sections are secured together either by suitable strappings or by the provision of longitudinal flanges which may be bolted together. Such two-section molds possess several inherent disadvantages. First, a certain amount of leakage at the mold joints results. Due to the presence of two such joints, this leakage becomes both expensive and troublesome. Second, in order to remove the finished product from the mold, it is necessary to either remove the strappings, when such are used, or to unbolt each pair of flanges and, in either case, remove one section of the mold. In view of the weights of materials used and the relatively high speeds at which the mold must be rotated to impart the required centrifugal force, a mold of considerable strength must be employed. These requirements necessitate the use of rather thick plate steel which, due to its great weight, is difficult to handle, with the result that the removal of one section of the mold is difficult and cumbersome.

In accordance with the present invention, an improved mold is provided which in large measure eliminates each of these disadvantages. Thus a mold is provided which contains but a single joint, thereby decreasing leakage. Further, a mold is provided which can be readily opened to release the finished product and which does not require the removal of any portion of the mold for that purpose.

Accordingly, it is a principal object of this invention to provide a mold for a concrete pipe-forming machine from which the finished pipe can be quickly and easily removed.

It is a further object of this invention to provide such a mold having but a single joint.

It is an additional object of this invention to provide such a mold having the required strength but constructed of comparatively light weight materials.

It is still another object of the invention to provide such a mold from which the finished product can be withdrawn without removing any section of the mold.

Other objects and advantages of the invention will be apparent during the course of the following description:

In the accompanying drawings, forming part of this application, and in which like numerals are employed to designate like parts throughout the same, Fig. 1 is a side view partially in section of a mold embodying the invention.

Fig. 5 is a side view of a mold embodying a modified form of the invention.

Fig. 6 is an end view illustrating the use of the mold shown in Fig. 1 in a different type of pipe forming machine.

Fig. 7 is an enlarged sectional view of a portion of the mold.

Figure 1:
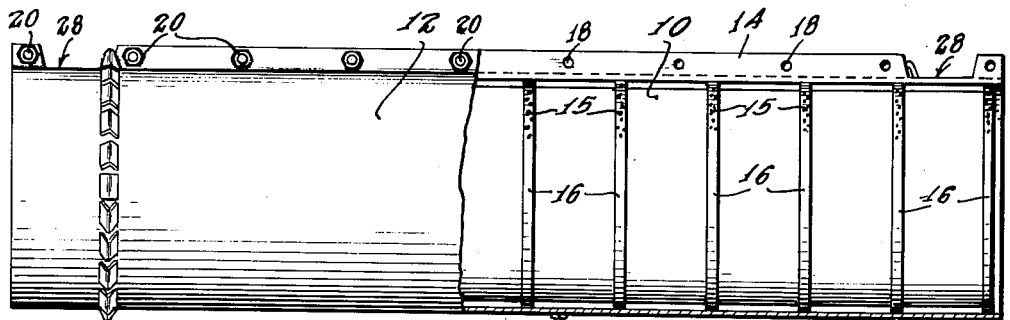
Figure 2:
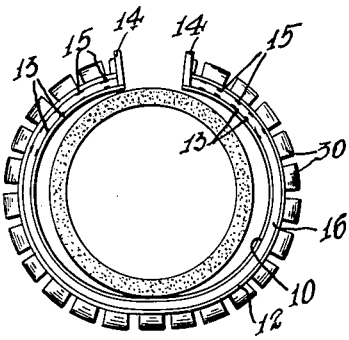
Fig. 2 is an end elevation showing the mold of Fig. 1 in an open or expanded position.
Figure 3:
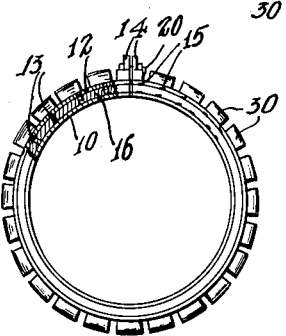
Fig. 3 is a cross-sectional view of the mold shown in Fig. 1 in a closed position.

Referring first to Figs. 1 through 3, wherein for the purpose of illustration is shown a preferred embodiment of the invention, the mold, which is of generally cylindrical form, is seen to consist of an inner shell 10 and a spaced outer shell 12. Each of the tubular shells is preferably formed of a metal sheet which is curved to form a tube which is longitudinally split its entire length. Longitudinal flanges 14 are secured, as by welding, to each side of the split portions of the inner shell 10. Flanges 14 are similarly secured to the outer shell 12, along the sides of the split portions thereof. A series of spacing ribs 16 are located between the shells 10 and 12. The spacing ribs are joined, as by welding, to the inner shell 10 and also to the flanges 14. While the spacing ribs 16 may be welded to the inner shell 10 about the entire circumference thereof, it has been found sufficient to spot or tack weld these members, as indicated by the numeral 13, at a few points in the vicinity of the flanges 14. In like manner, the outer shell 12 is spot or tack welded to the spacer ribs 16 at a few points 15 near the flanges 14. The remaining portion of the circumference of the outer shell 12 is preferably left free for reasons which will hereinafter be described. Flanges 14 are provided along their length with a plurality of aligned bolt holes 18 which are employed in conjunction with bolts 20 to hold the mold in the closed or operating position shown in Fig. 3.

Figure 4:
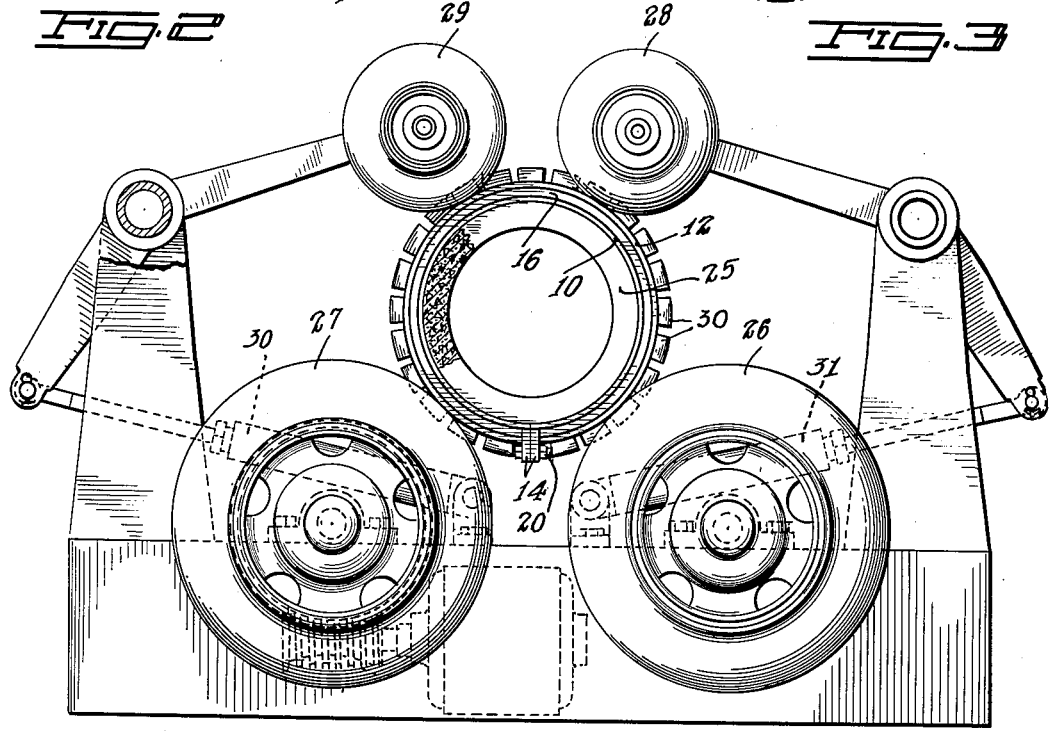
Fig. 4 is an end view illustrating the use of the mold shown in Fig. 1 in one type of pipe forming machine.

The mold is particularly adapted for use in machines such as those illustrated in Figs. 4, 5 and 6 wherein the mold rests upon two or more pairs of trunnions, one or more of which are driven so as to spin the mold. Referring to Fig. 6 which illustrates one of the simplest forms of a centrifugal type forming machine, there is shown a pair of trunnions 22 and 23, the latter of which is driven by a suitable power source indicated by the belt 38. In order that the mold may be carried by trunnions 22 and 23, the flanges 14 are cut away as at 28, so that the flanges will not strike the trunnions as the mold is spun. Adjacent but inwardly disposed from each end of the mold are a plurality of lugs 30 which serve as trunnion guides. As is apparent, the trunnion guides will prevent the mold moving laterally during the operation of the machine. In the embodiment of the invention illustrated in Figs. 1 through 4, the lugs 30 consist of a number of small angle irons which are welded to the outer shell 12. As is readily apparent, however, many different forms of trunnion guides can be employed which will perform the desired function. An air valve 32 disposed in the outer shell 12 and extending into the area between the inner and outer shells 10 and 12 is also provided. As will hereinafter be explained, this air valve greatly facilitates the opening of the mold to release the finished pipe, and is an important feature of the present invention. In machines of the type shown in Fig. 6, the trunnions 22 and 23 are customarily constructed of steel so as to possess sufficient strength to support the weight of the forms currently in use. While, as will hereinafter be explained, such steel trunnions have been found to be unnecessary, in the event a mold embodying the present invention is used, if a steel trunnion type machine is employed, in order to prevent excessive wear to the mold, it is advisable to provide additional trunnion surfaces which, when worn, can be replaced without the need of replacing any other portions of the mold. Such trunnion surfaces can be readily constructed of sheet steel extending circumferentially about the mold adjacent the lugs 30 and of sufficient width that the trunnions 22 and 23 will only engage such surfaces.

The mold is used in the following manner: The empty mold is placed upon the machine in such manner that each pair of trunnions 22 and 23 is positioned just outside the trunnion guides formed by the lugs 30. Suitable former rings 25 are placed at each end of the mold. Next, the mold is closed to the position shown in Fig. 3 by bolting together the abutting flanges 14. The mold is then spun at a relatively slow rate by means of the trunnions, during which time concrete in a semi-fluid state is introduced into the mold. The means employed to introduce such concrete, and the formation of a concrete pipe or other hollow body by centrifugal force resulting from the rapid spinning of the mold, are well known in the art, form no part of the present invention, and therefore will not be described herein. After the completion of the pipe-forming operation, the machine is stopped. To remove the finished product from the mold, it is necessary merely to remove the bolts 20 which hold together the abutting flanges 14. The mold can then be expanded in any suitable manner to the position shown in Fig. 2, and the completed pipe or other product withdrawn therefrom.

In order to withstand the very considerable forces present during the spinning operation, it is necessary that the mold be possessed of considerable strength. This requirement has, in the past, necessitated the construction of molds of relatively thick steel plate. As stated above, in order to provide a means for opening such a mold, it has been necessary to construct the mold of two semi-cylindrical sections which can be separated to open the mold. While attempts have been made to construct a mold which can be opened in the manner illustrated in Fig. 2, these attempts have failed because the heavy material necessary lacked the required resiliency. In accordance with the present invention, a mold is provided which, due to the double shell construction and the separating ribs therebetween, has sufficient strength and rigidity to withstand the spinning operation. Inasmuch, however, as the shells can be constructed of material of considerably lighter weight than heretofore employed, sufficient resiliency is realized to make possible the employment of a single joint mold which can be opened in the manner shown in Fig. 2. For example, it has been found that a mold of sufficient strength results if the shells 10 and 12 are formed of steel plates which are but 1/8" thick. On the other hand, experience has shown that if but a single shell mold is constructed, in order to obtain the necessary strength for usual operation, at least 5/16" steel plate is required. As seen, a mold constructed in accordance with the present invention possesses but a single joint which lies along the abutting flanges 14. Since the concrete employed in the centrifugal pipe casting machines in current use normally possesses a rather high water content, with the result that the concrete is in a semi-fluid state, the spinning of the mold causes a certain amount of leakage of the concrete through the joints. A further advantage of the single joint mold of the present invention over those of the prior art which were constructed of two semi-cylindrical sections and hence possessed two joints, is that this undesirable leakage is reduced by half.

While it is possible to open the mold to the position shown in Fig. 2 in several ways, the double shell construction of the mold makes possible an exceedingly simple and rapid procedure. Thus, by injecting compressed air between the two shells, through the air valve 32, the mold will be opened to the desired position by the resulting air pressure. By simply maintaining the air pressure between the shells, the mold can be maintained in the open position during the period of time required to withdraw the finished pipe therefrom. As above described, the spacing ribs 16 are welded to the shells 10 and 12 over only a portion of their circumference, and sufficient clearance is provided between the remaining portions of the ribs and the shells so that a continuous air chamber is provided throughout the length of the mold. The air chamber is preferably closed at the ends of the form by the former rings, although this can also readily be accomplished by welding the two end spacing ribs 16 to each of the shells 10 and 12 around their entire circumference.

In Fig. 4 is shown a pipe spinning machine for which a mold embodying the present invention is particularly adapted. Instead of steel trunnions of the type normally used, this machine is provided with pneumatic tire trunnions 26 and 27. Such trunnions possess several distinct advantages over steel trunnions, principal among them being lack of wear, vibration and noise. While such pneumatic trunnions can be used with existing types of molds, they are particularly suitable for the light weight mold of the present invention. In the machine shown in Fig. 4, pairs of holddown stabilizer trunnions 28 and 29 are employed, not only to insure that the mold bears against the trunnions 26 and 27 with the proper force, but also to prevent excessive vibration of the mold. The stabilizer trunnions 28 and 29 are also preferably of the pneumatic type. A pair of fluid rams 30 and 31, which may be either hydraulic or air, are provided both to regulate the force with which the stabilizer trunnions 28 and 29 bear against the mold and to provide a means for withdrawing the stabilizer trunnions to permit removal of the finished product.

While the machine shown in Fig. 4 forms no part of the present invention, it has been described inasmuch as the mold embodying the present invention has been found to be particularly suitable for such a machine. Further, while the mold has been described with reference to centrifugal type machines it is to be understood that, while it is particularly suitable for such machines, its application is not so limited and that the mold may be successfully used with other types of machines. It is further to be understood that the machine shown in Fig. 4 is the subject matter of a separate application for patent to be filed as copending with the instant application and that the disclosure herein of certain of the features of such machine is not intended to be an abandonment for patent purposes of such features.

In Fig. 5 is shown a mold of the type hereinabove described, to which has been added a pair of trunnion tracks 33 and 34. As seen, these tracks are formed to have a circumferential ring adapted to engage grooved roller trunnions 35 and 36. To spin the mold, these roller trunnions are driven by any suitable means, as for example, a power belt 38. The trunnion tracks 33 and 34 are secured to the outer shell 12 of the mold in any suitable manner, as by bolts 39. In addition, these tracks are split in the same manner as are the shells 10 and 12 so as to permit the expansion of the mold for removal of the finished product. The mold shown in Fig. 5 differs from that shown in Figs. 1 through 4 in that instead of a trunnion guide integrally associated with the mold, a replaceable mounted combined trunnion track and guide is employed.

It is to be understood that the form of the invention herewith shown and described is to be taken as a preferred embodiment of the same, and that various changes in the shape, size and arrangement of parts may be resorted to without departing from the spirit of the invention or the scope of the appended claims.

Having thus described the invention, I claim:

1. A cylindrical mold comprising a cylindrical inner shell, a cylindrical outer shell, each of said shells being provided with a single longitudinal split forming abutting end portions, a plurality of circumferential spacing ribs between said shells and an air valve extending disposed in the said outer shell, said shells and ribs being of relatively thin and resilient material so that said end portions may be sprung apart to open said mold.

2. A cylindrical mold comprising an inner shell, an outer shell, each of said shells being provided with a single longitudinal split forming abutting end portions, a plurality of spacing ribs between said shells, a pair of circumferentially disposed trunnion guides, each adjacent but inwardly spaced from one end of the said mold and an air valve extending disposed in the said outer shell, said shells and ribs being of relatively thin and resilient material so that said end portions may be sprung apart to open said mold.

3. A cylindrical mold comprising a generally cylindrical inner shell, said inner shell being provided with a single split longitudinally of its entire length, a generally cylindrical outer shell, said outer shell being similarly provided with a single split longitudinally of its entire length, said inner and outer shells being connected to each end to form an air chamber, a longitudinal flange secured to said inner and outer shells along one side of the split portion thereof, a second longitudinal flange secured to said inner and outer shells along the other side of the split portion thereof, a plurality of spacing ribs disposed between the said shells and secured to the said flanges and means for applying air under pressure to said air chamber, said shells and ribs being of relatively thin and resilient material so that said flanges may be sprung apart by said air under pressure to open said mold.

4. A cylindrical mold comprising a generally cylindrical inner shell, said inner shell being provided with a single split longitudinally of its entire length, a generally cylindrical outer shell, said outer shell being similarly provided with a single split longitudinally of its entire length, said inner and outer shells being connected at each end to form an air chamber, a longitudinal flange secured to said inner and outer shells along one side of the split portion thereof, a second longitudinal flange secured to said inner and outer shells along the other side of the split portion thereof, a plurality of spacing ribs disposed between the said shells and secured to the said flanges, a pair of circumferentially disposed trunnion guides, each adjacent but inwardly spaced from one end of the said mold and means for applying air under pressure to said air chamber, said shells and ribs being of relatively thin and resilient material so that said flanges may be sprung apart by said air under pressure to open said mold.

5. A cylindrical mold comprising an inner shell, an outer shell, each of said shells being provided with a single longitudinal split forming abutting end portions, a pair of circumferentially disposed trunnion guides on said outer shell, each guide being adjacent but inwardly spaced from one end of said mold, and a plurality of circumferential spacing ribs between said shells, said shells and ribs being of relatively thin and resilient material so that said end portions may be sprung apart to open said mold.

6. A cylindrical mold comprising a pair of spaced concentric shells, each of said shells being provided with a single longitudinal split forming abutting end portions, means for sealing said shells together to form an air chamber therebetween, and means for applying air under pressure to said air chamber, said shells being of relatively thin and resilient material so that said end portions may be sprung apart to open said mold.

References Cited in the file of this patent

UNITED STATES PATENTS

| 1,222,958 | Lienesch | Apr. 17, 1917 |
| 1,431,565 | Buente | Oct. 10, 1922 |
| 1,503,358 | Evans | July 29, 1924 |
| 1,672,941 | Hume | June 12, 1928 |
| 2,517,974 | Chase | Aug. 8, 1950 |
| 2,625,804 | Patch et al. | Jan. 20, 1953 |
| 2,644,984 | Crooker | July 14, 1953 |